United States Patent
Lin (10) Patent No.: US 12,055,174 B2
(45) Date of Patent: Aug. 6, 2024

(54) WOOD SCREW

(71) Applicant: KWANTEX RESEARCH INC., Tainan (TW)

(72) Inventor: Chao-Wei Lin, Tainan (TW)

(73) Assignee: KWANTEX RESEARCH INC., Tainan (TW)

( * ) Notice: Subject to any disclaimer, the term of this patent is extended or adjusted under 35 U.S.C. 154(b) by 189 days.

(21) Appl. No.: 17/411,649

(22) Filed: Aug. 25, 2021

(65) Prior Publication Data
US 2022/0325740 A1 Oct. 13, 2022

(30) Foreign Application Priority Data
Apr. 13, 2021 (TW) .................................. 110113237

(51) Int. Cl.
F16B 25/00 (2006.01)

(52) U.S. Cl.
CPC ...... F16B 25/0068 (2013.01); F16B 25/0015 (2013.01); F16B 25/0047 (2013.01)

(58) Field of Classification Search
CPC .............. F16B 25/0047; F16B 25/0015; F16B 25/0068
USPC ........................................................ 411/386
See application file for complete search history.

(56) References Cited

U.S. PATENT DOCUMENTS

| 5,895,187 A * | 4/1999 | Kuo-Tai | F16B 25/0068 411/311 |
| 6,328,516 B1 * | 12/2001 | Hettich | F16B 25/103 411/311 |
| 9,957,994 B2 * | 5/2018 | Hsu | F16B 25/103 |
| D895,411 S * | 9/2020 | Camilleri | D8/387 |
| 11,137,012 B2 * | 10/2021 | Hsu | F16B 25/0015 |
| 11,598,363 B2 * | 3/2023 | Shih | F16B 25/103 |

(Continued)

FOREIGN PATENT DOCUMENTS

| DE | 29824767 U1 | 8/2002 |
| DE | 202009016518 U1 | 3/2010 |

(Continued)

OTHER PUBLICATIONS

Search Report appended to an Office Action, which was issued to Taiwanese counterpart application No. 110113237 by the TIPO on Jan. 7, 2022 with an English translation thereof.

(Continued)

*Primary Examiner* — Gary W Estremsky
(74) *Attorney, Agent, or Firm* — MUNCY, GEISSLER, OLDS & LOWE, PC (57) ABSTRACT

A wood screw includes a head, a shank axially extending from the head, a main thread extending helically around the shank in a tightening direction and having an outer diameter ranging from 3 to 16 mm, and a plurality of forward ribs extending spirally around the shank in a same direction as the main thread. The number of the forward ribs ranges from three to five. Each forward rib, in a cross section thereof, has a first outer edge facing the tightening direction, and a second outer edge facing opposite the tightening direction and having a length shorter than that of the first outer edge. Each forward rib has a height smaller than that of the main thread, and a lead angle greater than that of the main thread.

12 Claims, 6 Drawing Sheets

(56) References Cited

U.S. PATENT DOCUMENTS

| | | | | |
|---|---|---|---|---|
| 2013/0039720 A1* | 2/2013 | Shih | ................... | F16B 25/0047 |
| | | | | 411/387.4 |
| 2017/0343029 A1* | 11/2017 | Hsu | ..................... | F16B 25/0052 |
| 2021/0102571 A1* | 4/2021 | Hu | ....................... | F16B 25/0015 |
| 2022/0090621 A1* | 3/2022 | Shih | ..................... | F16B 25/103 |

FOREIGN PATENT DOCUMENTS

| | | |
|---|---|---|
| EP | 3401557 A1 | 11/2018 |
| EP | 3225858 B1 | 12/2018 |
| JP | S63128308 U | 8/1988 |
| JP | 2009264395 A | 11/2009 |
| JP | 2020109321 A | 7/2020 |
| TW | M369396 U | 11/2009 |
| TW | M491743 U | 12/2014 |
| TW | M588178 U | 12/2019 |
| TW | M604844 U | 12/2020 |

OTHER PUBLICATIONS

Search Report issued to European counterpart application No. 21191004.7 by the EPO on Jan. 14, 2022.

Search Report appended to an Office Action, which was issued to Chinese counterpart application No. 202110778165.1 by the CNIPA on Aug. 26, 2023, with an English translation thereof.

Office Action issued to Japanese counterpart application No. 2021-160172 by the JPO on Nov. 29, 2022.

\* cited by examiner

WOOD SCREW

CROSS-REFERENCE TO RELATED APPLICATION

This application claims priority to Taiwanese Patent Application No. 110113237, filed on Apr. 13, 2021.

FIELD

The disclosure relates to a screw, more particularly to a wood screw for screwing into wood.

BACKGROUND

Figure 1:
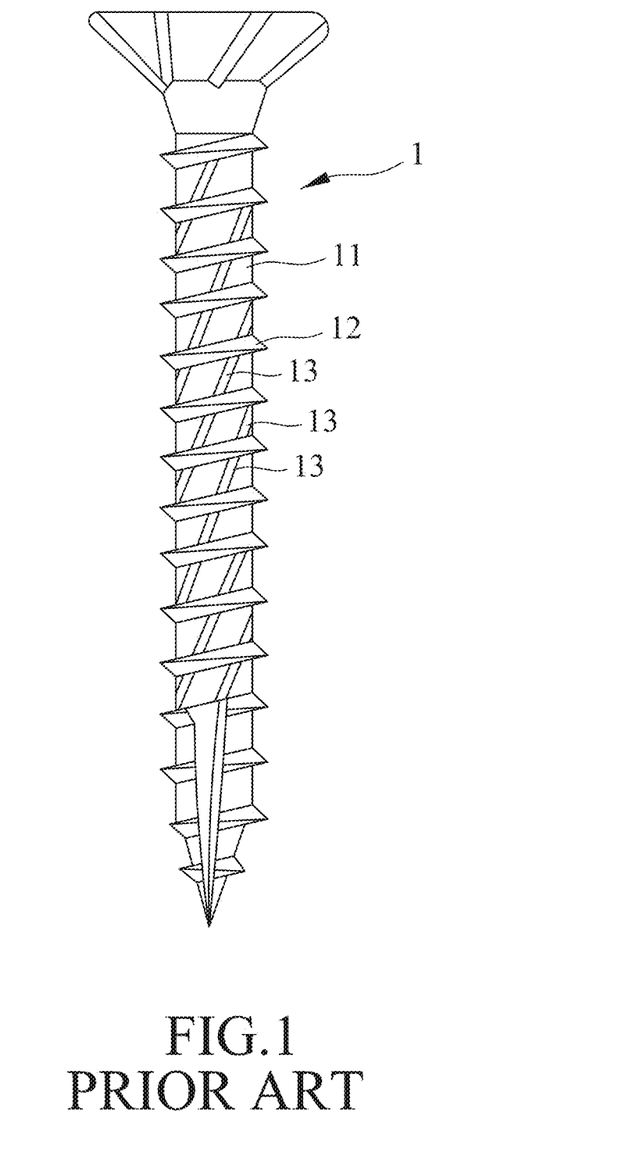
FIG. 1 is a side view of a wood screw disclosed in Taiwanese Utility Model Patent No. 301373.

Referring to FIG. 1, a wood screw 1 for screwing into wood is disclosed in Taiwanese Utility Model Patent No. 301373. In order to reduce the resistance when screwing into the wood, a screw shank 11 of the wood screw 1 is provided with a plurality of spiral cutting threads 13 in the same direction as a main thread 12 thereof. The spiral cutting threads 13 are arranged in parallel and are spaced apart from each other in an axial direction of the screw shank 11. Although the spiral cutting threads 13 can achieve a certain degree of reduction of the resistance, due to improper design and quantity configuration of the cutting threads 13, the wood screw 1 can cause problems, such as laborious application of force, excessive damage to wood fibers, etc. Further, after being screwed into the wood for a period of time, the wood screw 1 is easy to loosen in a reverse direction due to factors, such as vibration or weather, causing danger to a building structure.

SUMMARY

Therefore, an object of the present disclosure is to provide a wood screw that has anti-cracking and anti-loosening functions.

Accordingly, a wood screw of this disclosure includes a head, a shank, a main thread and a plurality of circumferentially spaced-apart forward ribs. The shank axially extends from the head, and has a main shank portion connected to the head, and a conical tip portion extending from the main shank portion in a direction away from the head and gradually tapering to form a conical tip end. The main thread protrudes from the shank and extends helically around the shank from the main shank portion to the conical tip end in a tightening direction. The main thread has an outer diameter ranging from 3 mm to 16 mm. The forward ribs protrude from the shank and extend spirally around the shank from the main shank portion to the conical tip portion in a same direction as the main thread. The forward ribs are spaced apart from the conical tip end by a distance. The number of the forward ribs ranges from three to five. In a cross section of each forward rib, each forward rib has a first outer edge connected to the shank and facing the tightening direction, and a second outer edge connected to the first outer edge and the shank and facing opposite the tightening direction. The second outer edge has a length shorter than a length of the first outer edge. Each forward rib has a height in a radial direction of the shank smaller than a height of the main thread in the radial direction of the shank, and a lead angle greater than a lead angle of the main thread.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the present disclosure is described in greater detail, it should be noted that like elements are denoted by the same reference numerals throughout the disclosure.

Figure 2:
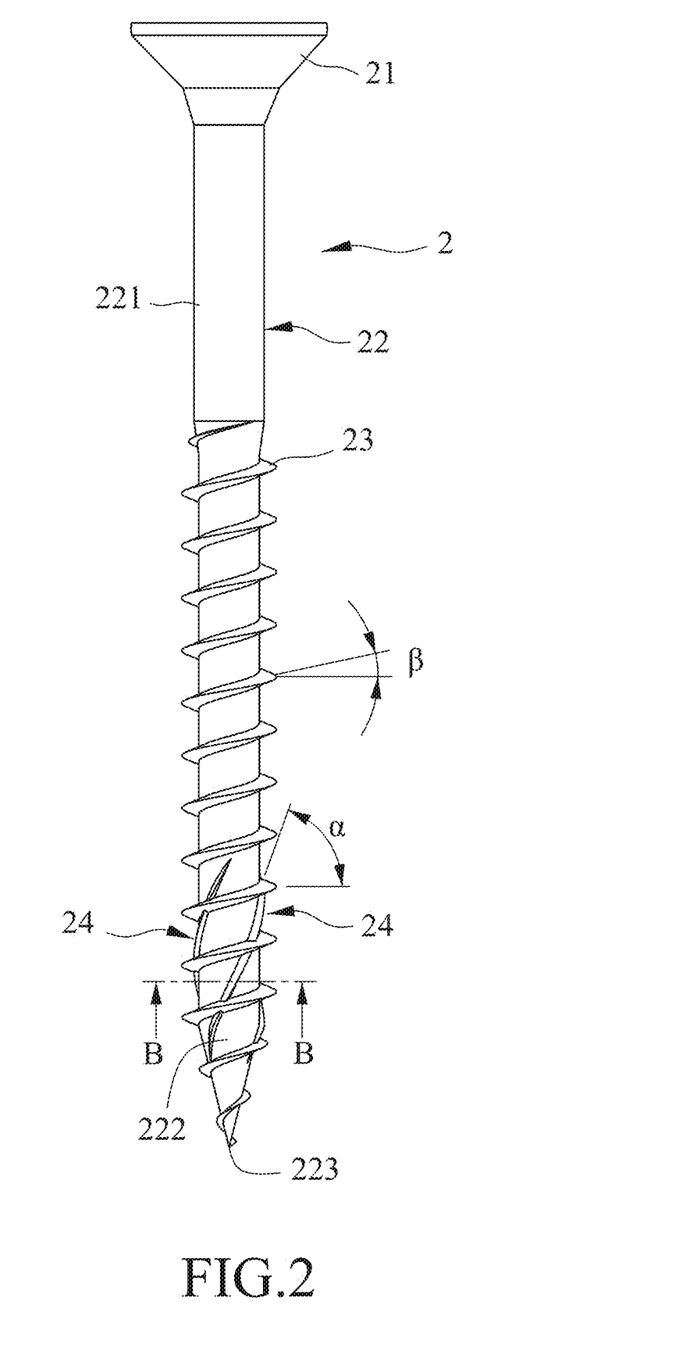
FIG. 2 is a side view of a wood screw according to the first embodiment of the present disclosure.
Figure 3:
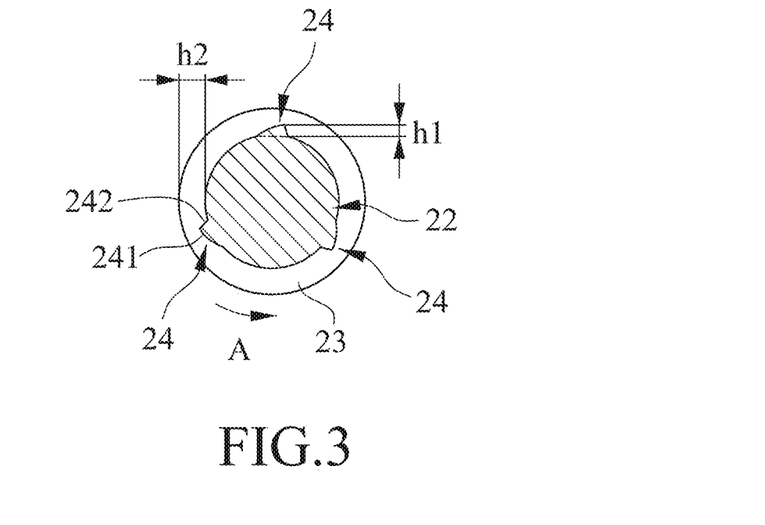
FIG. 3 is a sectional view taken along line B-B of FIG. 2.
Figure 4:
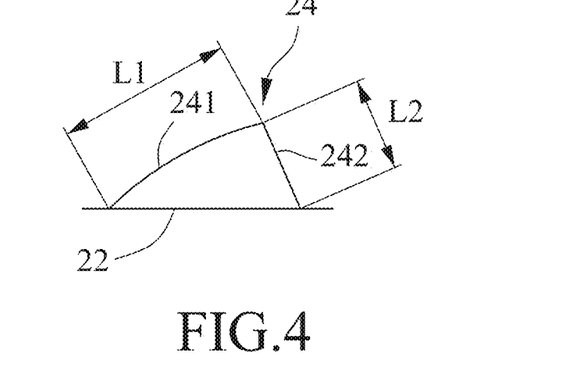
FIG. 4 is a schematic view, illustrating a cross section of a forward rib of the first embodiment.
Figure 5:
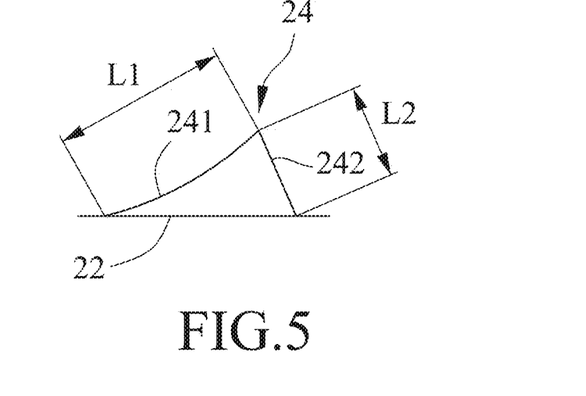
FIGS. 5 to 8 illustrate various alternative configurations of the forward rib of the first embodiment.
Figure 6:
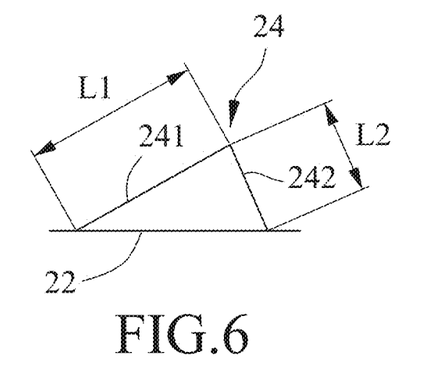
Figure 7:
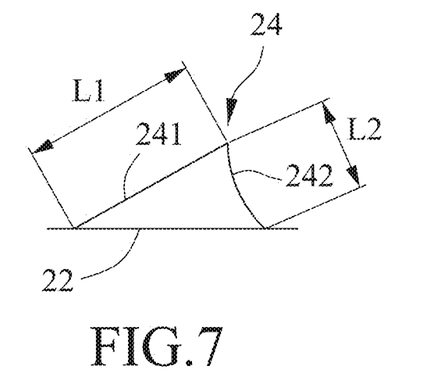
Figure 8:
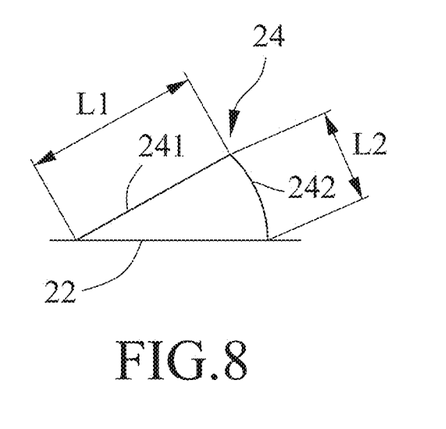

FIGS. 2 to 4 illustrate a wood screw 2 according to the first embodiment of the present disclosure. It should be noted herein that, in the description of the first embodiment, the wood screw 2 is screwed into wood (not shown) along a tightening direction (A) when in use, the tightening direction (A) may be a clockwise or a counterclockwise direction, and FIG. 3 is a sectional view taken along line B-B of FIG. 2. The wood screw 2 includes a head 21, a shank 22, a main thread 23, and a plurality of forward ribs 24.

The shank 22 axially extends from the head 21, and has a main shank portion 221 connected to the head 21, and a conical tip portion 222 extending from the main shank portion 221 in a direction away from the head 21 and gradually tapering to form a conical tip end 223.

The main thread 23 protrudes from the shank 22 and extends helically around the shank 22 from the main shank portion 221 to the conical tip end 223 in the tightening direction (A). The main thread 23 has an outer diameter ranging from 3 mm to 16 mm. A distance between the main thread 23 and the head 21 can be freely determined according to the requirement. Of course, there may be no distance between the main thread 23 and the head 21.

The forward ribs 24 protruding from the shank 22 are circumferentially spaced apart from each other, and extend spirally around the shank 22 from a lower portion of the main shank portion 221 to the conical tip portion 222 in the same direction as the main thread 23, but are spaced apart from the conical tip end 223 by a distance. In this embodiment, the forward ribs 24 are equiangularly spaced apart from each other, and each forward rib 24 extends about 150 to 270 degrees around the shank 22 in the tightening direction (A). In this embodiment, the number of the forward ribs 24 is three. In other embodiments, the number of the forward ribs 24 may be four or five depending on the outer diameter of the main thread 23. Preferably, when the outer diameter of the main thread 23 is larger than or equal to 3 mm but smaller than or equal to 10 mm, the number of the forward ribs 24 is three; when the outer diameter of the main thread 23 is larger than 10 mm but smaller than or equal to 14 mm, the number of the forward ribs 24 is four; and when the outer diameter of the main thread 23 is larger than 14 mm but smaller than or equal to 16 mm, the number of the forward ribs 24 is five.

Through the coordination of the size of the outer diameter of the main thread 23 and the number of the forward ribs 24, when the wood screw 2 is screwed into the wood, the wood screw 2 will not generate excessive driving torque caused by the structure of wood during the screwing process, and can effectively prevent wood cracks resulting from squeezing of the wood fibers. Each forward rib 24 has a height (h1) in a radial direction of the shank 22 smaller than a height (h2) of the main thread 23 in the radial direction of the shank 22, and a lead angle ($\alpha$) greater than a lead angle ($\beta$) of the main thread 23. The lead angle ($\alpha$) is within the range of 50 to 60 degrees.

In a cross section of each forward rib 24, with reference to FIGS. 2 to 4, each forward rib 24 has a first outer edge 241 connected to the shank 22 and facing the tightening direction (A), and a second outer edge 242 connected to the first outer edge 241 and the shank 22 and facing opposite the tightening direction (A). Specifically, the first outer edge 241 extends outwardly from the shank 22 in a direction opposite to the tightening direction (A), and the second outer edge 242 extends outwardly from the shank 22 in a direction toward the tightening direction (A) and is connected to the first outer edge 241 at one end thereof that is distal to the shank 22. The second outer edge 242 has a slope steeper than a slope of the first outer edge 241. The first outer edge 241 has a length (L1) greater than a length (L2) of the second outer edge 242. Preferably, the ratio of the length (L1) of the first outer edge 241 to the length (L2) of the second outer edge 242 ranges from 1.25 to 2.6. According to the aforementioned structure of the first outer edge 241 and the second outer edge 242, when the wood screw is screwed into the wood, the first outer edge 241 of each forward rib 24 serves as a pushing surface that drives into the wood to gradually expand the hole without completely destroying the wood fiber in the original position, which not only reduces the driving torque of the wood screw 2, but also because part of the wood material recovers inertially and covers the wood screw 2, the safe pull-out force of the wood screw 2 can be maintained. Further, the second outer edge 242 of each forward rib 24 serves as a blocking surface when the wood screw 2 is rotated in a direction reverse to the tightening direction (A) to provide a corresponding resistance for preventing the wood screw 2 from loosening in the direction reverse to the tightening direction (A). When the length ratio (L1/L2) of the first outer edge 241 and the second outer edge 242 ranges within 1.25 to 2.6, the effects of anti-cracking and anti-loosening can be simultaneously achieved.

Referring to FIGS. 5 to 8, each of the first outer edge 241 and the second outer edge 242 may be, according to the requirement, a straight line, a curved line facing toward the shank 22, or a curved line facing away from the shank 22. The first outer edge 241 and the second outer edge 242 can be matched with each other, as shown in FIGS. 5 to 8, and can be interchanged arbitrarily according to the requirement.

Referring back to FIGS. 2 to 4, when the wood screw 2 is driven into the wood (not shown), the first outer edges 241 of the forward ribs 24 can drive into the wood with low driving torque to gradually expand the hole without completely destroying the wood fiber in the original position, apart from reducing the driving torque during the screwing process, the construction efficiency can be promoted as well. Then, through the coordination of the size of the outer diameter of the main thread 23 and the number of the forward ribs 24, and with part of the wood material returning to its original position by inertia to cover the wood screw 2, the safe pull-out force of the wood screw 2 can be maintained, and, because the wood fiber is not completely destroyed, the safety strength of the wood can be maintained. Further, after the wood screw 2 is screwed to the wood, the second outer edge 242 of each forward rib 24 can generate a corresponding resistance when the wood screw 2 rotates in the reverse direction to prevent the wood screw 2 from loosening, thereby maintaining the wood screw 2 screwed to the wood. Through the design of the first and second outer edges 241, 242 of each forward rib 24, the anti-cracking and anti-loosening effects of the wood screw 2 can be simultaneously achieved. Moreover, by optimizing the length ratio (L1/L2) of the first and second outer edges 241, 242, a double effect improvement of construction efficiency and structural safety can be achieved.

Figure 9:
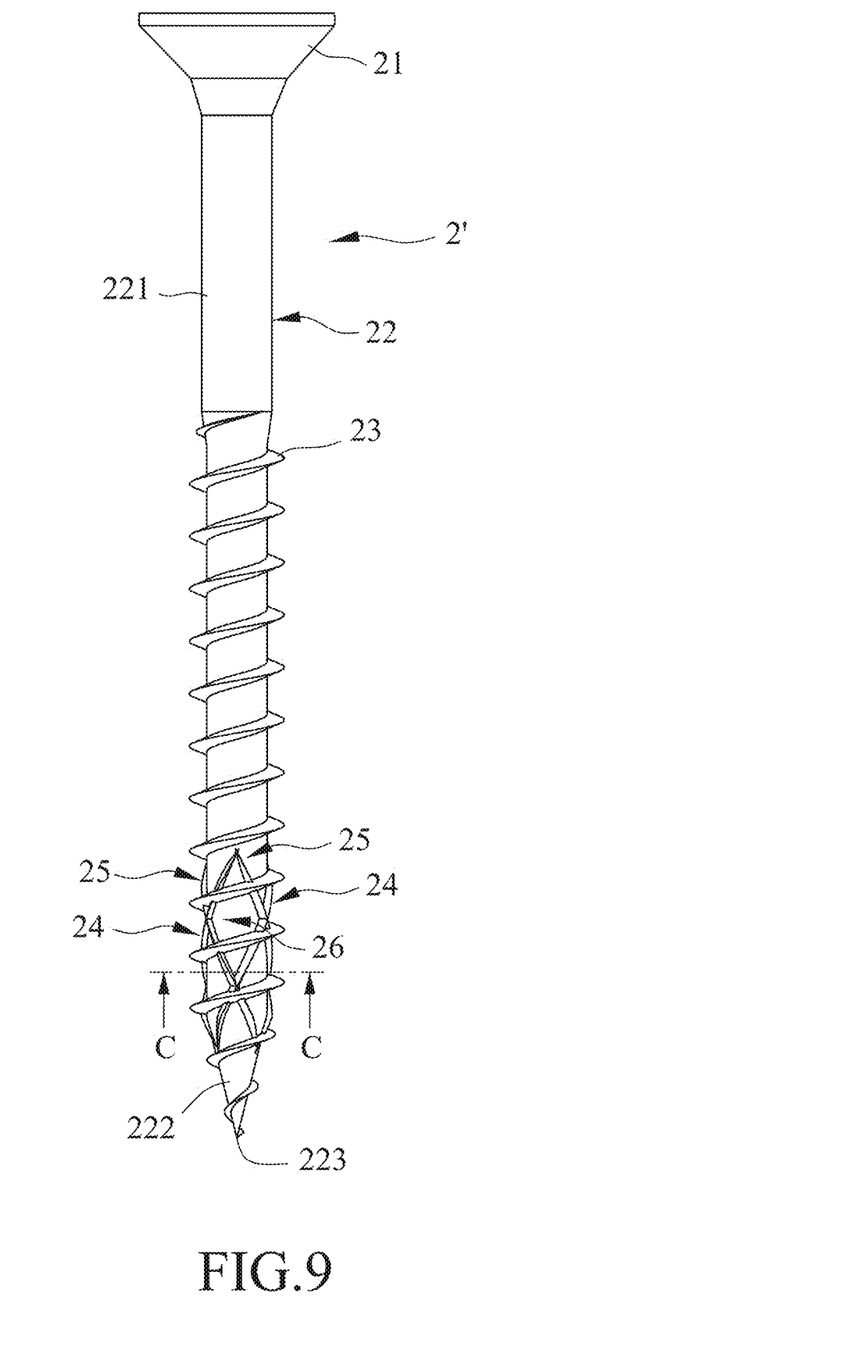
FIG. 9 is a side view of a wood screw according to the second embodiment of the present disclosure.
Figure 10:
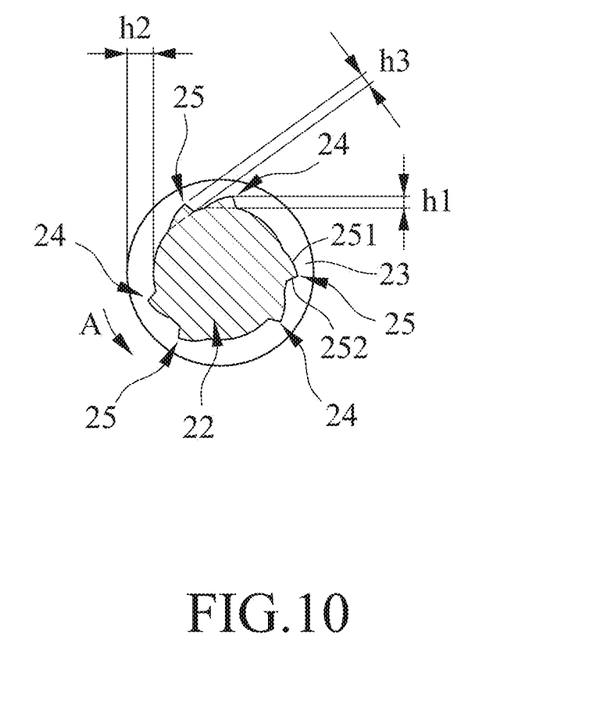
FIG. 10 is a sectional view taken along line C-C of FIG. 9.
Figure 11:
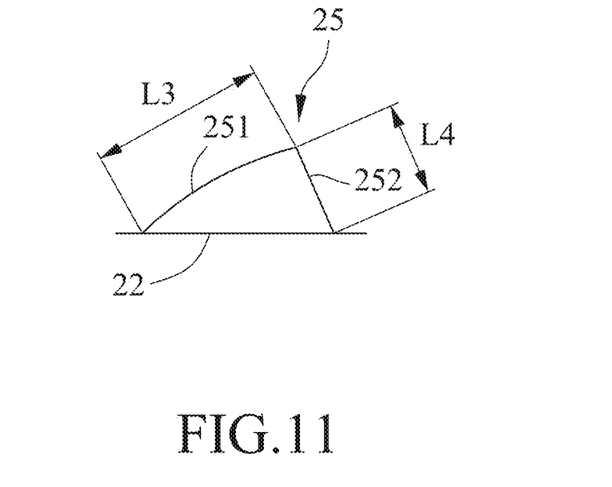
FIG. 11 is a schematic view, illustrating a cross section of a reverse rib of the second embodiment.

Referring to FIGS. 9 to 11, the second embodiment of the wood screw 2' according to this disclosure is shown to be similar to the first embodiment, but differs in that, in the second embodiment, the wood screw 2' further comprises a plurality of reverse ribs 25 protruding from the shank 22 and spirally extending around the shank 22 in a direction opposite to the forward ribs 24. The reverse ribs 25 intersect with the forward ribs 24, and cooperate with the same to define a plurality of chip-receiving grooves 26. It should be noted herein that, in this embodiment, the number of the reverse ribs 25 corresponds to the number of the forward ribs 24. However, the number of the reverse ribs 25 may be one according to the requirement. Each reverse rib 25 has a height (h3) in the radial direction of the shank 22 smaller than the height (h1) of each forward rib 24. In a cross section of each reverse rib 25, each reverse rib 25 has a first outer edge 251 connected to the shank 22 and facing the tightening direction (A), and a second outer edge 252 connected to the first outer edge 251 and the shank 22 and facing opposite the tightening direction (A). A length (L3) of the first outer edge 251 may be greater or smaller than a length (L4) of the second outer edge 252.

The design of the second embodiment can be adopted according to the actual screwing requirement and the application environment (for example, environment with frequent vibration or large climate change). Through the reverse ribs 25, the area of the blocking surface that prevents reverse loosening of the wood screw 2' can be increased to enhance the anti-loosening effect. Further, since the forward ribs 24 have driven into the wood with low driving torque, and since the height (h3) of each reverse rib 25 is smaller than the height (h1) of each forward rib 24, the addition of the reverse ribs 25 will not cause the wood screw 2 to generate additional resistance when it is driven into the wood, thereby promoting construction efficiency and improving safety. Moreover, the chip-receiving grooves 26 can evenly accommodate the wood chips generated during screwing to avoid uneven distribution of wood chips which causes squeezing of the accumulated wood chips, so that the effect of preventing the wood from cracking can be achieved.

In summary, through the number and the structural design of the forward ribs 24 of the wood screw 2, 2' of this disclosure, excessive driving torque during the screwing process can be avoided, and, because the wood fiber in the original position is not completely destroyed, and part of the wood material can return to its original position by inertia to cover the wood screw 2, the safe pull-out force of the wood screw 2 can be maintained. Further, the second outer edge 242 of each forward rib 24 can generate a corresponding resistance to prevent the wood screw 2, 2' from loosening in the reverse direction. Thus, this disclosure can simultaneously achieve anti-cracking and anti-loosening effects.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A wood screw comprising:
    a head;
    a shank axially extending from said head and having a main shank portion connected to said head, and a conical tip portion extending from said main shank portion in a direction away from said head and gradually tapering to form a conical tip end;
    a main thread protruding from said shank and extending helically around said shank from said main shank portion to said conical tip end in a tightening direction, said main thread having an outer diameter ranging from 3 mm to 16 mm;
    a plurality of circumferentially spaced-apart forward ribs protruding from said shank and extending spirally around said shank from said main shank portion to said conical tip portion in a same direction as said main thread, said forward ribs being spaced apart from said conical tip end by a distance, the number of said forward ribs ranging from three to five; and
    at least one reverse rib protruding from said shank and spirally extending around said shank in a direction opposite to said forward ribs, said at least one reverse rib intersecting with at least one of said forward ribs to define at least one chip-receiving groove;
    wherein, in a cross section of each of said forward ribs, each of said forward ribs has a first outer edge connected to said shank and facing the tightening direction, and a second outer edge connected between said shank and one end of said first outer edge that is distal to said shank, said second outer edge facing opposite the tightening direction, and having a length shorter than a length of said first outer edge;
    wherein each of said forward ribs has a height in a radial direction of said shank smaller than a height of said main thread in the radial direction of said shank, and a lead angle greater than a lead angle of said main thread.

2. The wood screw as claimed in claim 1, wherein said lead angle of each of said forward ribs is within the range of 50 to 60 degrees.

3. The wood screw as claimed in claim 1, wherein each of said forward ribs extends about 150 to 270 degrees around said shank in the tightening direction.

4. The wood screw as claimed in claim 1, wherein said first outer edge of each of said forward ribs is one of a straight line, a curved line facing toward said shank, and a curved line facing away from said shank.

5. The wood screw as claimed in claim 1, wherein said second outer edge of each of said forward ribs is one of a straight line, a curved line facing toward said shank, and a curved line facing away from said shank.

6. The wood screw as claimed in claim 1, wherein said at least one reverse rib has a height in the radial direction of said shank smaller than the height of each of said forward ribs.

7. The wood screw as claimed in claim 1, wherein, in a cross section of said at least one reverse rib, said at least one reverse rib has a first outer edge connected to said shank and facing the tightening direction, and a second outer edge connected to said first outer edge of said at least one reverse rib and said shank and facing opposite the tightening direction, said first outer edge and said second outer edge of said at least one reverse rib having unequal lengths.

8. The wood screw as claimed in claim 1, wherein said at least one reverse rib includes a plurality of reverse ribs corresponding in number to said forward ribs.

9. The wood screw as claimed in claim 1, wherein the number of said forward ribs is three, and said outer diameter of said main thread is greater than or equal to 3 mm, but is smaller than or equal to 10 mm.

10. The wood screw as claimed in claim 1, wherein the number of said forward ribs is four, and said outer diameter of said main thread is greater than 10 mm, but is smaller than or equal to 14 mm.

11. The wood screw as claimed in claim 1, wherein the number of said forward ribs is five, and said outer diameter of said main thread is greater than 14 mm, but is smaller than or equal to 16 mm.

12. The wood screw as claimed in claim 1, wherein a ratio of the length of said first outer edge to the length of said second outer edge ranges from 1.25 to 2.6.

* * * * *